United States Patent

Edwards

[15] 3,667,573
[45] June 6, 1972

[54] DRAIN SPOUT ATTACHMENT
[72] Inventor: James D. Edwards, 828 East Plymouth, Glendora, Calif. 91740
[22] Filed: Sept. 15, 1970

[52] U.S. Cl. ................................................................184/1.5
[51] Int. Cl. ......................................................F16n 33/00
[58] Field of Search ..............184/1.5, 106; 141/84, 98, 106, 141/333, 334, 364, 365, 366, 391

[56] References Cited

UNITED STATES PATENTS

| | | | |
|---|---|---|---|
| 137,731 | 4/1873 | Springer | 141/334 |
| 582,652 | 5/1897 | Larson | 141/334 |
| 195,138 | 9/1877 | Lathrop | 141/365 |
| 1,101,941 | 6/1914 | Haralson et al. | 141/365 |
| 1,871,522 | 8/1932 | Holmes et al. | 141/334 |
| 2,023,007 | 12/1935 | Delano | 184/1.5 |
| 2,701,078 | 2/1955 | Bowman | 141/366 |

*Primary Examiner*—Houston S. Bell, Jr.
*Attorney*—Boniard I. Brown

[57] ABSTRACT

A drain spout attachment for an automobile crankcase oil drainage receptacle of the type having an upright collection tank with an upwardly opening funnel at its upper end and adapted for collecting drainage oil from the crankcase of an automobile elevated on a hoist. The spout attachment mounts on and projects horizontally from the funnel rim in a manner such that the receptacle may be placed below the automobile with the spout projecting over the hoist frame member which normally underlies the automobile crankcase drain opening to permit location of the spout directly below the drain opening.

1 Claims, 3 Drawing Figures

PATENTED JUN 6 1972 3,667,573
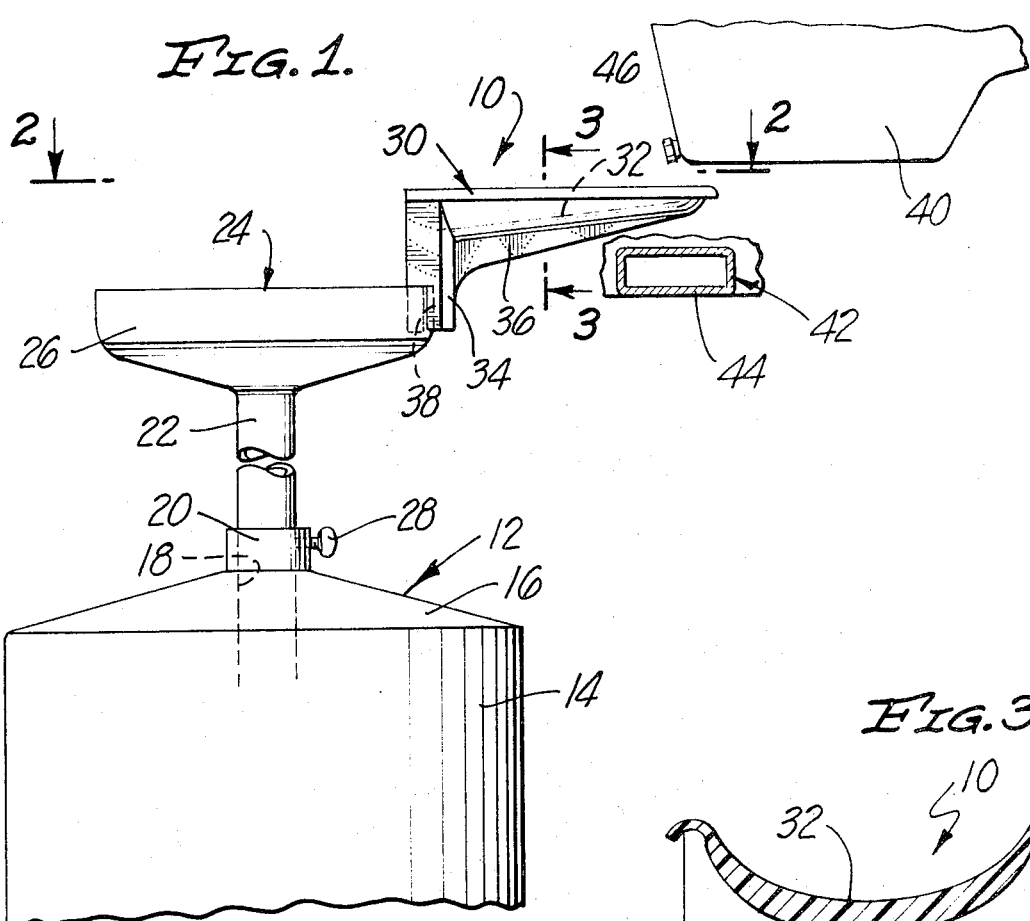
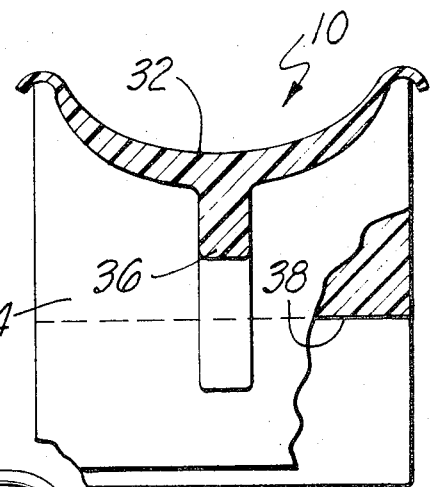
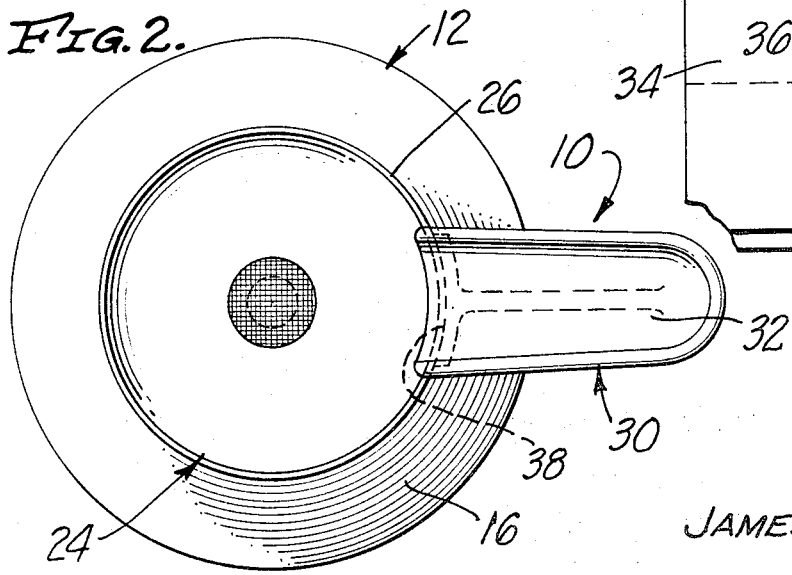
INVENTOR
JAMES D. EDWARDS
BY
Ronald V. Brown
ATTORNEY

3,667,573

DRAIN SPOUT ATTACHMENT

BACKGROUND OF THE INVENTION

1. Field of the Invention

This invention relates generally to the field of automobile servicing and more particularly to a spout attachment for an automobile crankcase drainage oil receptacle.

2. Prior Art

As is well known to all automobile owners, the crankcase of an automobile must be periodically drained of oil and then refilled with clean oil. This task is accomplished in automobile service facilities, such as garages and service stations, by elevating the automobile on a hydraulic hoist, removing the plug from the crankcase drain opening, and locating a drainage receptacle in a position to receive the oil draining through the opening.

The drainage receptacle commonly used for this purpose has an upright oil collection tank supported on rollers, such that it may be easily moved, and an upwardly opening funnel at the upper end of the tank. The funnel has a depending outlet pipe which slides in an opening in the upper tank wall to permit vertical adjustment of the funnel. The funnel is locked in adjusted position by a set screw or the like. In use, the receptacle funnel is located below the automobile crankcase drain opening to receive the drainage oil from the opening.

This task of draining an automobile crankcase presents one problem which the present invention cures. The problem referred to stems from the fact that a conventional hydraulic automobile hoist has a cross-frame member which, unfortunately, is so situated that it directly underlies the crankcase drain opening of most automobiles. It is often difficult or impossible to locate the funnel of the oil drainage receptacle between this frame member and drain opening. As a result, when draining a crankcase, oil commonly spills into the frame member, as well as other parts of the hoist, and onto the floor. Wiping up this spilled oil is a dirty and time consuming task and requires the use of many wiping rags which must then be cleaned.

SUMMARY OF THE INVENTION

The present invention avoids the above oil spillage problem by providing a drain spout attachment for a crankcase oil drainage receptacle of the class described. This spout attachment mounts on and projects horizontally from the rim of the drainage receptacle funnel, such that the spout may be located between the crankcase of an automobile elevated on a hoist and the underlying frame member of the hoist. The spout is placed directly below the crankcase drain opening and contains a trough which opens through the funnel end of the spout for conducting drainage oil to the funnel.

According to a feature of the invention, the drain spout is arranged for ease of installation on and removal from the funnel of the drainage receptacle. In the disclosed inventive embodiment, for example, the spout has a slotted mounting flange which simply slides over the funnel rim.

BRIEF DESCRIPTION OF THE DRAWINGS

FIG. 1 illustrates the present drain spout attachment installed on a conventional crankcase drainage oil receptacle and disposed in position below the crankcase drain opening of an automobile on an elevated hoist;

FIG. 2 is a top view of the drainage receptable and drain spout, taken on line 2—2 in FIG. 1; and FIG. 3 is an enlarged section taken on line 3—3 in FIG. 1.

DESCRIPTION OF THE PREFERRED EMBODIMENTS

The drawings illustrate a present drain spout attachment 10 installed on a conventional crankcase drainage receptacle 12. Receptacle 12 has an upright oil collection tank 14 which is commonly supported on rollers, not shown, to permit the receptacle to be wheeled from one location to another. Tank 14 has a top-end wall 16 containing a central opening 18 surrounded by an annular wall or collar 20. Slidable in the opening 18 is the depending outlet pipe 22 of a funnel 24. Funnel 24 opens upwardly and is bounded by a cylindrical rim 26. Funnel 24 is adjustable vertically relative to the collection tank 14 and is locked in adjusted position by a set screw 28.

The present drain spout attachment 10 has an elongate body 30 which may be injection molded from plastic or metal. Spout body 30 is shaped to provide an elongate trough 32 and a depending mounting flange 34 at one end of the trough. This end of the trough is open. A reinforcing rim or gusset 36 joins the trough and flange. As shown best in FIG. 1, the trough 32 is tapered toward its outer end, i.e. the end opposite the mounting flange 34. Entering the lower end of the mounting flange is a slot 38 which is curved to the same radius as the receptacle funnel rim 26. The drain spout 10 is installed on the drainage receptacle 12 by sliding the spout flange 34 over the funnel rim 26, as shown in FIG. 1.

When thus installed on the drainage receptacle 12, the drain spout trough 32 projects horizontally outward from the funnel rim 26. The open inner end of the trough opens to the funnel 24. The bottom wall of the trough is located above the upper edge of the funnel rim 26 and slopes downwardly at a slight angle in the direction of the inner trough end.

Turning to FIG. 1, the reference numeral 40 denotes the crankcase of an automobile elevated on a hydraulic hoist 42. As noted earlier, a conventional hoist of this kind has a cross-frame member 44 which directly underlies the crankcase drain opening 46 and complicates the task of draining the crankcase with the conventional drainage receptacle 12.

According to the present invention, the drain spout 10 is sized and shaped such that the outer end of its trough 32 may be easily inserted between the crankcase 40 and frame member 44 to a position directly below the drain opening 46, as shown. The oil emerging from the drain opening thus falls directly into the trough and then flows through the trough into the funnel 24. Accordingly, the present drain spout completely cures the oil spillage problem discussed earlier and thereby avoids the cleanup task and wipe up rag use which attend the spillage problem.

What is claimed as new in support of Letters Patent is:

1. A drain spout for releasable attachment to an automotive crankcase oil drainage receptacle of the type having an upright collection tank and an upwardly opening funnel at the upper end of said tank, said spout comprising:

an elongate upwardly opening trough including a depending flange at one end having a cylindrically curved slot entering the lower end of and extending upwardly through the flange with the concave side of the slot facing in the direction of said one spout end for mounting the spout on the rim of said receptacle funnel in a position of use wherein said funnel rim seats in said slot and the other end of the spout projects generally horizontally beyond said rim with the bottom wall of said trough located above the level of said funnel rim, whereby said receptacle may be placed under an automobile elevated on a hoist in a position wherein said spout is located directly below the crankcase drain opening of the automobile to receive oil draining through the opening, and said trough being open at said one end only and having a bottom wall which slopes downwardly in the direction of said open end, whereby when said trough is mounted on said receptacle funnel, oil drains from said trough into said funnel.

* * * * *